US012671744B2

(12) United States Patent
Rajagopalan et al.

(10) Patent No.: US 12,671,744 B2
(45) Date of Patent: Jun. 30, 2026

(54) DYNAMIC EXPERIENTIAL SNAPSHOTS

(71) Applicant: Dell Products L.P., Round Rock, TX (US)

(72) Inventors: Vivekanandh Narayanasamy Rajagopalan, Bangalore (IN); Ramanujam Kaniyar Venkatesh, Bangalore (IN); Anantha K. Boyapalle, Cedar Park, TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 18/644,639

(22) Filed: Apr. 24, 2024

(65) Prior Publication Data

US 2025/0337813 A1 Oct. 30, 2025

(51) Int. Cl.
H04L 67/30 (2022.01)
G06F 11/1446 (2026.01)

(52) U.S. Cl.
CPC .......... H04L 67/30 (2013.01); G06F 11/1464 (2013.01)

(58) Field of Classification Search
None
See application file for complete search history.

(56) References Cited

U.S. PATENT DOCUMENTS

| | | | | |
|---|---|---|---|---|
| 8,069,341 B2 * | 11/2011 | Fries | ........................ | G06F 8/63 713/1 |
| 2007/0174429 A1 * | 7/2007 | Mazzaferri | ........... | H04L 63/102 709/218 |
| 2009/0144701 A1 * | 6/2009 | Faus | ................... | G06F 9/44505 717/121 |
| 2016/0117163 A1 * | 4/2016 | Fukui | ........................ | G06F 8/65 717/171 |
| 2022/0094614 A1 * | 3/2022 | Khurshid | .............. | H04L 41/147 |
| 2023/0409343 A1 * | 12/2023 | Iyer | ........................ | H04L 67/52 |
| 2024/0340658 A1 * | 10/2024 | Parker | ................. | H04L 41/0856 |

* cited by examiner

*Primary Examiner* — Jeffrey R Swearingen
(74) *Attorney, Agent, or Firm* — Jackson Walker L.L.P.

(57) ABSTRACT

An information handling system may include at least one processor and a memory. The information handling system is configured to: communicatively couple to a client system, wherein the client system is associated with a current one of a plurality of potential workspaces, wherein each workspace includes a defined set of information handling resources; receive, from the client system, a manifest indicative of the set of information handling resources associated with the current workspace; determine an experience snapshot for the current workspace, wherein the experience snapshot includes a plurality of configuration settings for the set of information handling resources; and transmit the experience snapshot to the client system, wherein the client system is configured to apply the experience snapshot by applying the plurality of configuration settings to the set of information handling resources.

18 Claims, 4 Drawing Sheets

300

302 — USER'S LOGIN

304 — CLIENT DEVICE BOOTS

306 — AGENT SVC ANTICIPATE USER ACTIONS AND PRE-FETCH EXPERIENCE CONFIGURATION SNAPSHOT

308 — CLOUD SVC SENDS THE CONFIGURATION ?

YES → 310 — APPLY THE CONFIGURATION

NO

312 — MONITOR THE SYSTEM AND WAIT FOR THE CONFIGURATION FROM CLOUD SVC

314 — CLOUD SVC START SEARCHING THE EXPERIENCE CONFIGURATION SNAPSHOT

316 — COMPUTE THE LOCATION

DYNAMIC EXPERIENTIAL SNAPSHOTS

TECHNICAL FIELD

The present disclosure relates in general to information handling systems, and more particularly to management of personalized workspaces.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

For purposes of this disclosure, a "workspace" refers to the ecosystem of devices (such as a webcam, monitor, keyboard, mouse, printer, dock, Bluetooth headset, etc. connected to an information handling system via wired or wireless protocols at a given time. An "experience snapshot" or "experiential snapshot" (ESS) contains configuration information for the devices present in the workspace for a given experience.

Such configuration information may include any configuration settings for the devices in a workspace, such as monitor configuration (resolution, portrait/landscape orientation, multi-monitor locations, etc.), audio configuration (default input and output devices, volume levels, etc.), peripheral configuration (default printer, printer settings, webcam settings, keyboard settings, mouse settings, etc.) and in general any configuration settings relevant to the devices that are associated with that workspace. It is desirable for a user to have configuration information applied quickly and seamlessly via the correct ESS when using a given workspace.

With the increasing adoption of hybrid work schedules, users may often switch across workspaces having different hardware. For example, a given user might have a first workspace including a USB-C docking station, one HDMI monitor, a Bluetooth headset with integrated microphone, an integrated webcam, a wired keyboard, and a wired mouse. The user might also sometimes use a second workspace in a different location including a different USB-C docking station, a conferencing monitor, a USB webcam, a wireless keyboard, a wireless mouse, and a wired headset. The user may have other workspaces as well.

With different devices across the workspaces providing various capabilities, there can be a large number of combinations of personalized configurations for a given user. It can be difficult to select the correct workspace configuration and configure the user's devices in a timely manner.

Workspaces may be managed by a mechanism that allows the experience configuration snapshots to be assigned based on capabilities of the devices, the context (e.g., office vs. home), the application, the day, and the time. Various issues may arise, however.

For example, finding the right experience snapshot that is applicable for a given workspace experience is time-consuming without an optimized search. Further, frequent context switching and short stays in a given workspace may result in a session ending before the correct configuration can be identified and applied. Further, the experience snapshots are typically captured and stored when the user starts a workspace session and tunes the configurations based on the workload and devices present in the workspace, and so they may become obsolete if the user doesn't return to the same workspace or a workspace with a similar device combination, resulting in slowness in identifying the matching experience snapshot.

In short, there has so far been no satisfactory way to find the right experience snapshot (or a suitable default) and apply it to provide a seamless ecosystem experience. Embodiments of this disclosure improve on this situation.

It should be noted that the discussion of a technique in the Background section of this disclosure does not constitute an admission of prior-art status. No such admissions are made herein, unless clearly and unambiguously identified as such.

SUMMARY

In accordance with the teachings of the present disclosure, the disadvantages and problems associated with management of personalized workspaces may be reduced or eliminated.

In accordance with embodiments of the present disclosure, an information handling system may include at least one processor and a memory. The information handling system is configured to: communicatively couple to a client system, wherein the client system is associated with a current one of a plurality of potential workspaces, wherein each workspace includes a defined set of information handling resources; receive, from the client system, a manifest indicative of the set of information handling resources associated with the current workspace; determine an experience snapshot for the current workspace, wherein the experience snapshot includes a plurality of configuration settings for the set of information handling resources; and transmit the experience snapshot to the client system, wherein the client system is configured to apply the experience snapshot by applying the plurality of configuration settings to the set of information handling resources.

In accordance with these and other embodiments of the present disclosure, a method may include an information handling system communicatively coupling to a client system, wherein the client system is associated with a current one of a plurality of potential workspaces, wherein each workspace includes a defined set of information handling resources; the information handling system receiving, from the client system, a manifest indicative of the set of information handling resources associated with the current workspace; the information handling system determining an experience snapshot for the current workspace, wherein the experience snapshot includes a plurality of configuration settings for the set of information handling resources; and the information handling system determining the experience snapshot to the client system, wherein the client system is configured to apply the experience snapshot by applying the plurality of configuration settings to the set of information handling resources.

In accordance with these and other embodiments of the present disclosure, an article of manufacture may include a non-transitory, computer-readable medium having computer-executable instructions thereon that are executable by a processor of an information handling system for: communicatively coupling to a client system, wherein the client system is associated with a current one of a plurality of potential workspaces, wherein each workspace includes a defined set of information handling resources; receiving, from the client system, a manifest indicative of the set of information handling resources associated with the current workspace; determining an experience snapshot for the current workspace, wherein the experience snapshot includes a plurality of configuration settings for the set of information handling resources; and determining the experience snapshot to the client system, wherein the client system is configured to apply the experience snapshot by applying the plurality of configuration settings to the set of information handling resources.

Technical advantages of the present disclosure may be readily apparent to one skilled in the art from the figures, description and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Figure 1:
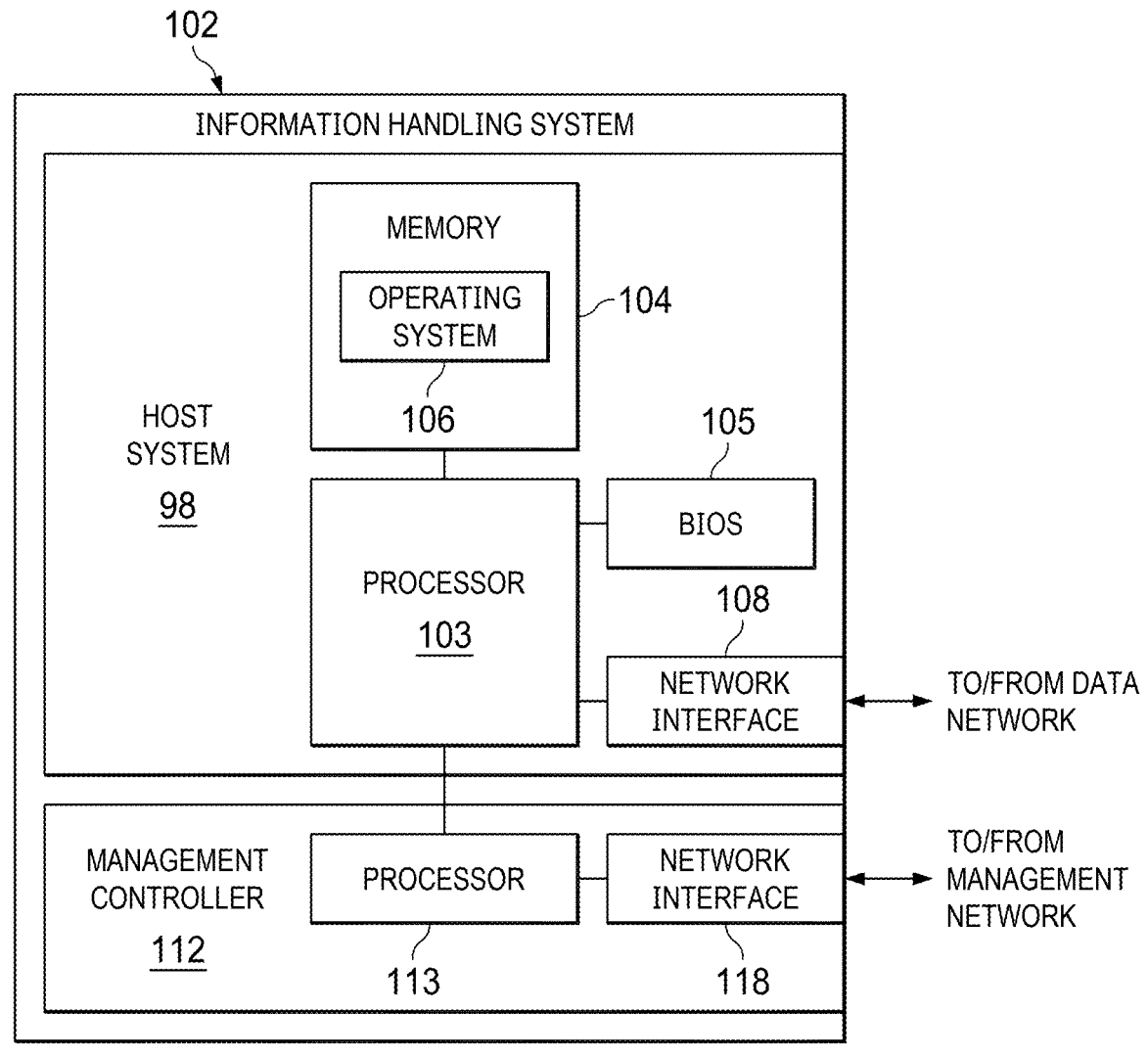
FIG. 1 illustrates a block diagram of an example information handling system, in accordance with embodiments of the present disclosure.
Figure 2:
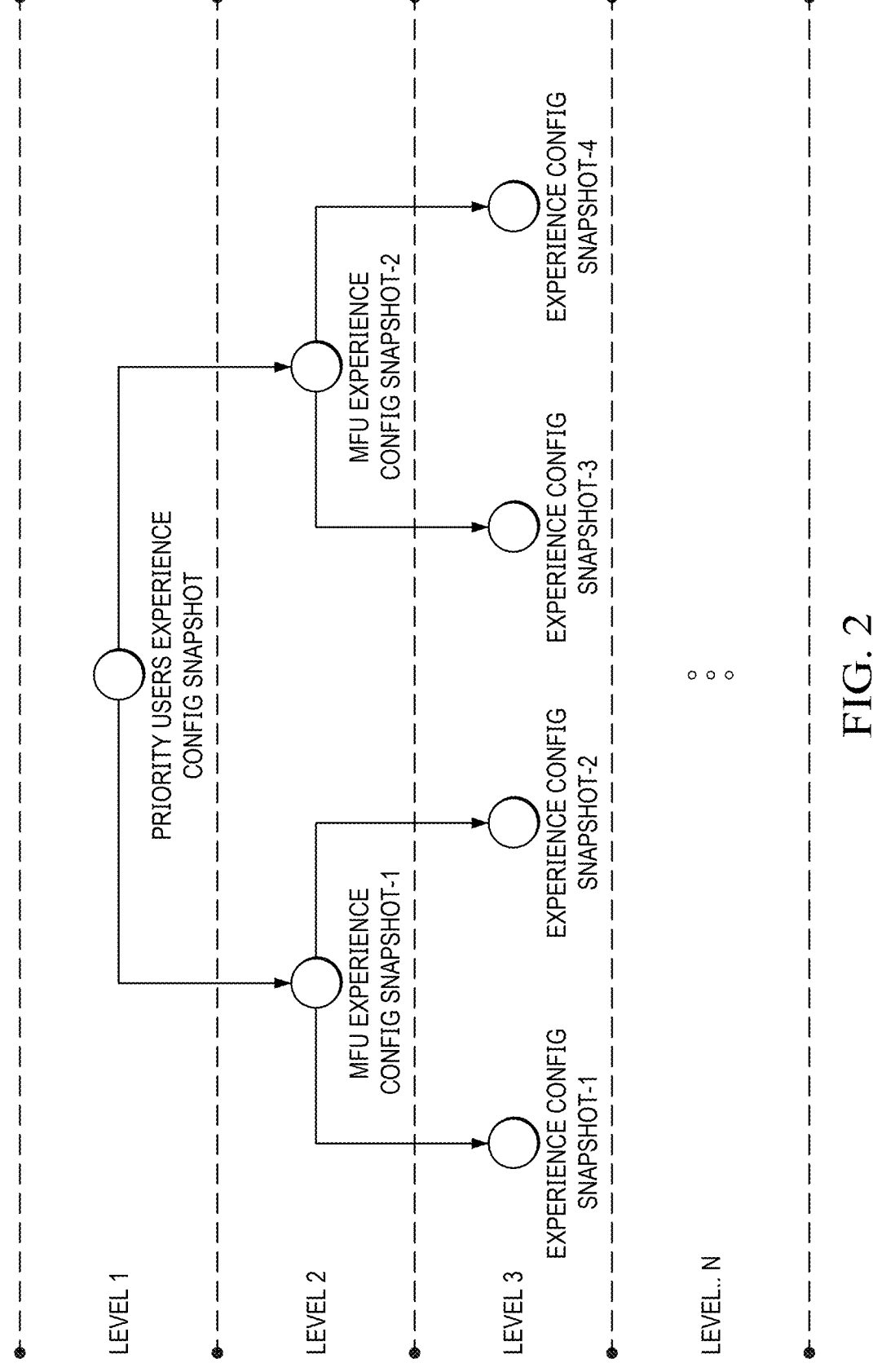
FIG. 2 illustrates a tree topology of experience snapshots, in accordance with embodiments of the present disclosure.

Preferred embodiments and their advantages are best understood by reference to FIGS. 1 through 3, wherein like numbers are used to indicate like and corresponding parts.

For the purposes of this disclosure, the term "information handling system" may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a personal digital assistant (PDA), a consumer electronic device, a network storage device, or any other suitable device and may vary in size, shape, performance, functionality, and price. The information handling system may include memory, one or more processing resources such as a central processing unit ("CPU") or hardware or software control logic. Additional components of the information handling system may include one or more storage devices, one or more communications ports for communicating with external devices as well as various input/output ("I/O") devices, such as a keyboard, a mouse, and a video display. The information handling system may also include one or more buses operable to transmit communication between the various hardware components.

For purposes of this disclosure, when two or more elements are referred to as "coupled" to one another, such term indicates that such two or more elements are in electronic communication or mechanical communication, as applicable, whether connected directly or indirectly, with or without intervening elements.

When two or more elements are referred to as "coupleable" to one another, such term indicates that they are capable of being coupled together.

For the purposes of this disclosure, the term "computer-readable medium" (e.g., transitory or non-transitory computer-readable medium) may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; communications media such as wires, optical fibers, microwaves, radio waves, and other electromagnetic and/or optical carriers; and/or any combination of the foregoing.

For the purposes of this disclosure, the term "information handling resource" may broadly refer to any component system, device, or apparatus of an information handling system, including without limitation processors, service processors, basic input/output systems, buses, memories, I/O devices and/or interfaces, storage resources, network interfaces, motherboards, and/or any other components and/or elements of an information handling system.

For the purposes of this disclosure, the term "management controller" may broadly refer to an information handling system that provides management functionality (typically out-of-band management functionality) to one or more other information handling systems. In some embodiments, a management controller may be (or may be an integral part of) a service processor, a baseboard management controller (BMC), a chassis management controller (CMC), or a remote access controller (e.g., a Dell Remote Access Controller (DRAC) or Integrated Dell Remote Access Controller (iDRAC)).

FIG. 1 illustrates a block diagram of an example information handling system 102, in accordance with embodiments of the present disclosure. In some embodiments, information handling system 102 may comprise a server chassis configured to house a plurality of servers or "blades." In other embodiments, information handling system 102 may comprise a personal computer (e.g., a desktop computer, laptop computer, mobile computer, and/or notebook computer). In yet other embodiments, information handling system 102 may comprise a storage enclosure configured to house a plurality of physical disk drives and/or other computer-readable media for storing data (which may generally be referred to as "physical storage resources"). As shown in FIG. 1, information handling system 102 may comprise a processor 103, a memory 104 communicatively coupled to processor 103, a BIOS 105 (e.g., a UEFI BIOS) communicatively coupled to processor 103, a network interface 108 communicatively coupled to processor 103, and a management controller 112 communicatively coupled to processor 103.

In operation, processor 103, memory 104, BIOS 105, and network interface 108 may comprise at least a portion of a host system 98 of information handling system 102. In addition to the elements explicitly shown and described, information handling system 102 may include one or more other information handling resources.

Processor 103 may include any system, device, or apparatus configured to interpret and/or execute program instructions and/or process data, and may include, without limitation, a microprocessor, microcontroller, digital signal processor (DSP), application specific integrated circuit (ASIC), or any other digital or analog circuitry configured to interpret and/or execute program instructions and/or process data. In some embodiments, processor 103 may interpret and/or execute program instructions and/or process data stored in memory 104 and/or another component of information handling system 102.

Memory 104 may be communicatively coupled to processor 103 and may include any system, device, or apparatus configured to retain program instructions and/or data for a period of time (e.g., computer-readable media). Memory 104 may include RAM, EEPROM, a PCMCIA card, flash memory, magnetic storage, opto-magnetic storage, or any suitable selection and/or array of volatile or non-volatile memory that retains data after power to information handling system 102 is turned off.

As shown in FIG. 1, memory 104 may have stored thereon an operating system 106. Operating system 106 may comprise any program of executable instructions (or aggregation of programs of executable instructions) configured to manage and/or control the allocation and usage of hardware resources such as memory, processor time, disk space, and input and output devices, and provide an interface between such hardware resources and application programs hosted by operating system 106. In addition, operating system 106 may include all or a portion of a network stack for network communication via a network interface (e.g., network interface 108 for communication over a data network). Although operating system 106 is shown in FIG. 1 as stored in memory 104, in some embodiments operating system 106 may be stored in storage media accessible to processor 103, and active portions of operating system 106 may be transferred from such storage media to memory 104 for execution by processor 103.

Network interface 108 may comprise one or more suitable systems, apparatuses, or devices operable to serve as an interface between information handling system 102 and one or more other information handling systems via an in-band network. Network interface 108 may enable information handling system 102 to communicate using any suitable transmission protocol and/or standard. In these and other embodiments, network interface 108 may comprise a network interface card, or "NIC." In these and other embodiments, network interface 108 may be enabled as a local area network (LAN)-on-motherboard (LOM) card.

Management controller 112 may be configured to provide management functionality for the management of information handling system 102. Such management may be made by management controller 112 even if information handling system 102 and/or host system 98 are powered off or powered to a standby state. Management controller 112 may include a processor 113, memory, and a network interface 118 separate from and physically isolated from network interface 108.

As shown in FIG. 1, processor 113 of management controller 112 may be communicatively coupled to processor 103. Such coupling may be via a Universal Serial Bus (USB), System Management Bus (SMBus), and/or one or more other communications channels.

Network interface 118 may be coupled to a management network, which may be separate from and physically isolated from the data network as shown. Network interface 118 of management controller 112 may comprise any suitable system, apparatus, or device operable to serve as an interface between management controller 112 and one or more other information handling systems via an out-of-band management network. Network interface 118 may enable management controller 112 to communicate using any suitable transmission protocol and/or standard. In these and other embodiments, network interface 118 may comprise a network interface card, or "NIC." Network interface 118 may be the same type of device as network interface 108, or in other embodiments it may be a device of a different type.

As discussed above, embodiments of this disclosure address shortcomings in the management of configuration of devices in different workspaces. Embodiments may address these issues by using a dynamic experiential snapshot computation technique. Each user may be provided with a unique experience identifier (xID), and the xID may be associated with the ESS of each of a plurality of configurations. Each xID will thus have a number "n" ESSs associated therewith, with each ESS including a number "m" of configurations based on capabilities, location, day/time, application, etc.

To determine the best ESS to apply in a given situation, embodiments may provide an enhanced dynamic experiential computation technique by considering parameters such as the most frequently used workspaces, priority, time to live (TTL), workspace capabilities, etc.

In one embodiment, an Agent Service may play the role of a contextual analyzer on a user's information handling system. The Agent Service may communicate with a Cloud Service, which is responsible for building and maintaining experiential snapshots, as well as finding and retrieving them as needed.

When a user logs in, the Agent Service may enumerate all the connected devices and create a manifest (e.g., in Javascript Object Notation (JSON) or some other suitable format) which carries unique device information for each connected device. It may then compute a hash for the manifest and sign the hash with a private key which has been pre-provisioned from the factory. It may establish a connection with the Cloud Service and send the manifest along with the user's xID. The Cloud Service may then re-compute the hash on the received manifest and verify it based on the public key corresponding to the private key. If a corresponding workspace doesn't already exist, then the Cloud Service may create the workspace and associate an administrator-defined default snapshot, which carries a default configuration. If the workspace does already exist, then the Cloud Service may search for the correct associated experience configuration snapshot via a search technique discussed below and send it to the Agent Service. The Agent Service may then download the experience configuration snapshot and apply the configuration to the client device.

The Agent Service may also monitor the user's information handling system for hot-plug events. When the system is hot-plugged into a dock, the Agent Service creates and sends the signed manifest along with the xID to the Cloud Service. The Cloud Service verifies the signature and checks for an experience configuration snapshot for the xID. If it is not present, then the Cloud Service creates an experience configuration snapshot for this combination of devices according to the snapshot tree building technique discussed below. If it is already present, then the Cloud Service searches the experience configuration snapshot based on the snapshot tree search technique and sends the experience configuration snapshot. A TTL may also be calculated for each workspace in some embodiments, such that a roaming workspace may be indicated if the TTL is very small for a user in particular workspace. In this situation, there may be no need to fetch the experience configuration snapshot, as the user is frequently changing workspaces.

Additionally, when a user makes a change to a device's configuration, the Agent Service detects the change and sends the updated configuration to the Cloud Service. The Cloud Service may search for the correct experience configuration snapshot based on the combinations of devices, and then update the it with the received configuration change. The snapshot tree building technique may be employed to adjust the configuration snapshot. When the user logs in or disconnects and reconnects the device, the Agent Service may receive the updated experience configuration snapshot and apply the configuration as explained above.

FIG. 2 illustrates an example of dynamic experiential snapshot computation. As shown, the computation may include consideration of user priority. For example, the administrator may decide which users are priority users, and while creating the configuration snapshot for a given user, the configuration snapshots may be placed at the top of the ESS tree, so that the search can serve the priority user's request quickly. Further, the most frequently used (MFU) snapshots may be computed and placed below the priority user nodes so that the search may serve those requests fairly quickly as well.

Figure 3A:
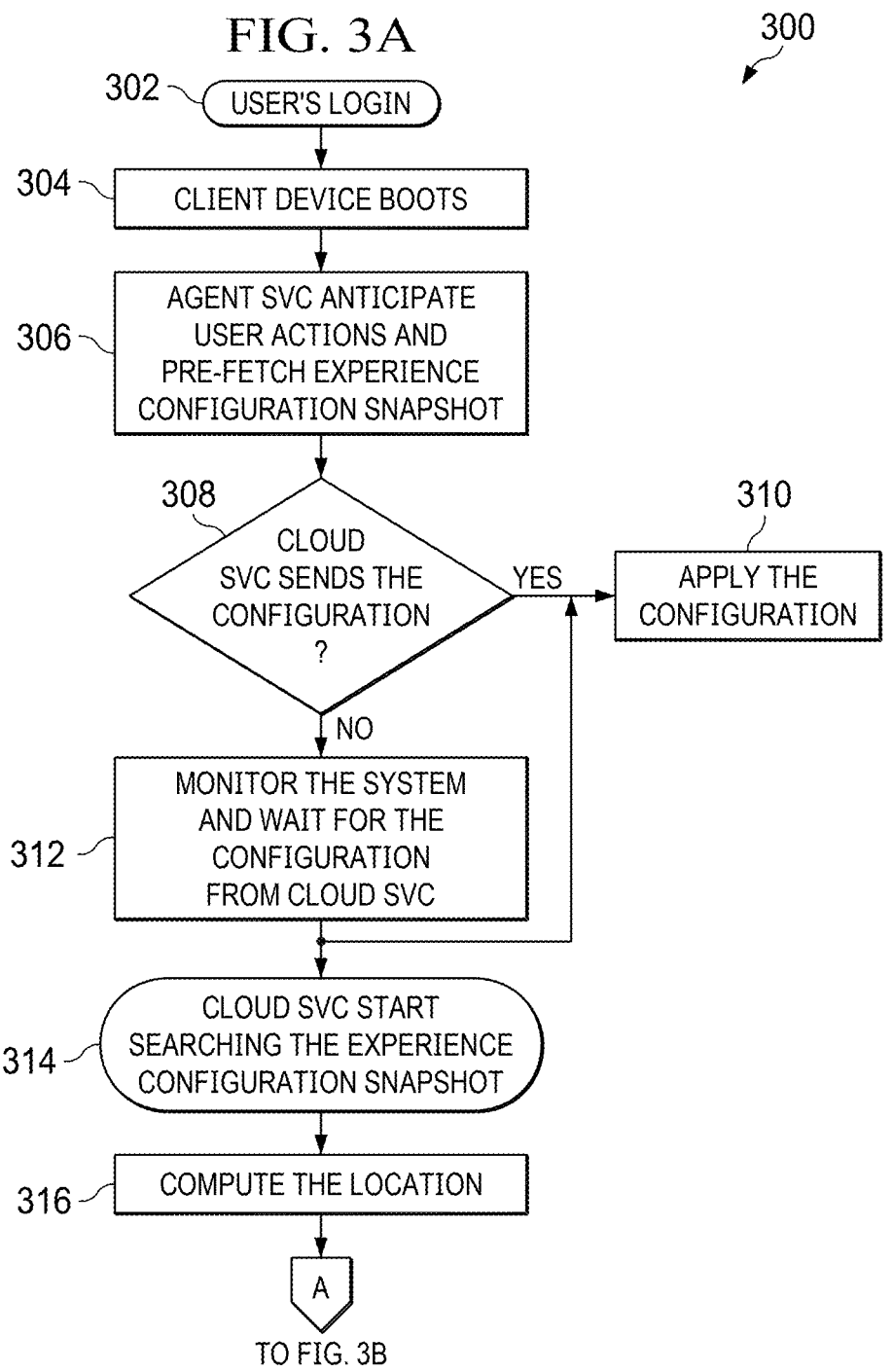
FIGS. 3A and 3B illustrate an example method, in accordance with embodiments of the present disclosure.
Figure 3B:
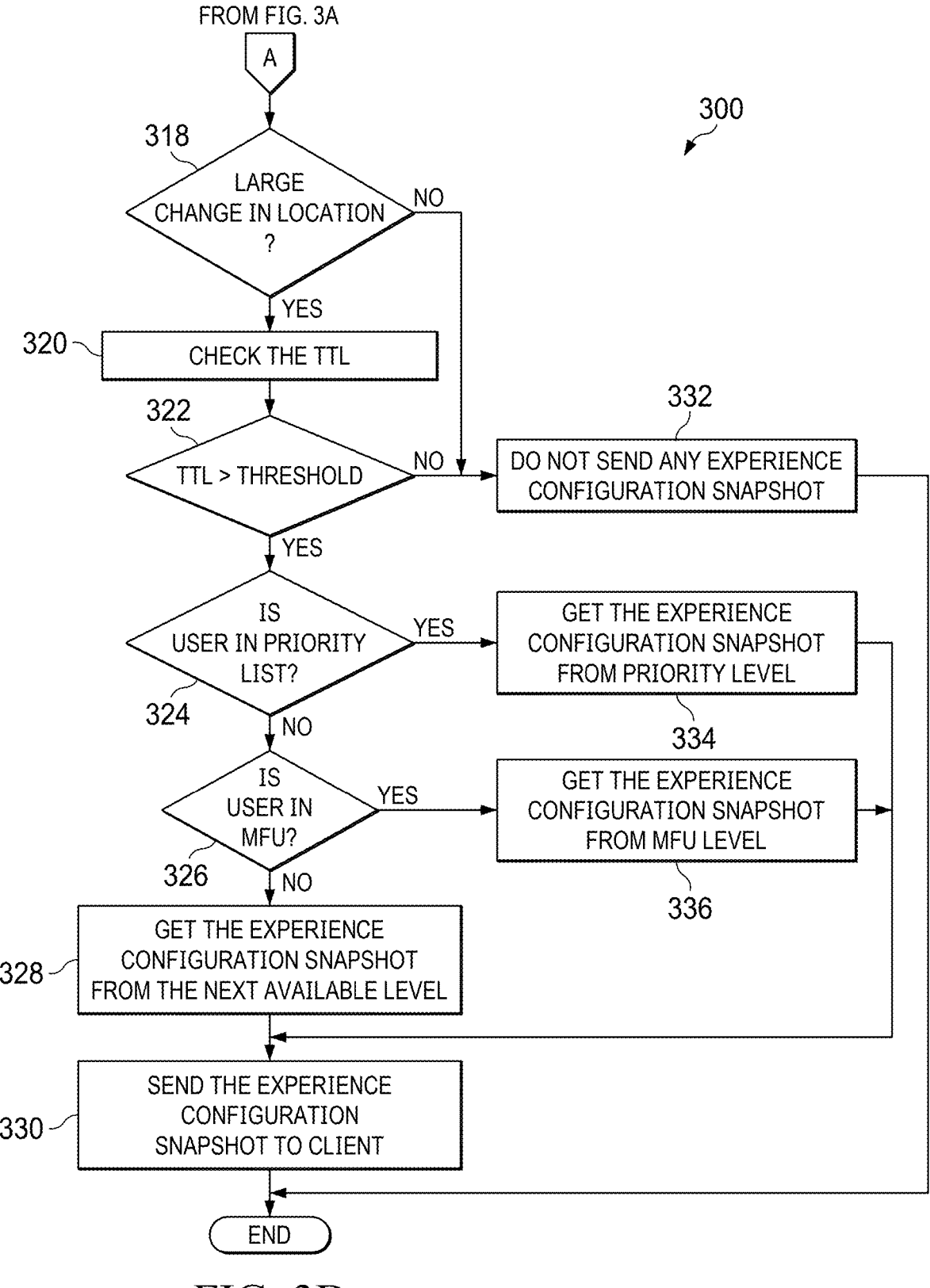

FIGS. 3A and 3B illustrate a flowchart for searching for the appropriate snapshot. At steps 302 and 304, a user logs in and the client device boots up. At step 306, the Agent Service executing on the client device pre-fetches an ESS from the Cloud Service based on a prediction of the user's needs. This prediction may be based on the user's historical behavior. For example, if a user often accesses a particular application, the ESS associated with that application may be preloaded. The pre-fetching may also be based on the user's historical workspace usage, the time of day, the day of the week, the user's geographic location, and/or any other suitable factors.

If the Cloud Service sends the ESS at step 308, it is applied at step 310 and the method ends. Otherwise, the Agent Service continues to monitor the client device for changes and wait for configuration information from the Cloud Service at step 312.

Meanwhile, beginning at step 314, the Cloud Service searches for the optimal ESS. If the user's location has changed less than a threshold distance since the previous ESS was downloaded, or if the user's TTL is set above a threshold value, then at step 322, no updated ESS is sent. The TTL may refer to the duration for which the snapshot is retained for a given user and experience combination. Storing and searching too many experience combinations can be resource intensive, and so the frequently used configuration are flagged as MFU, and a TTL is configured by an administrator as a policy with some default value (e.g., 30 days).

If the user is a priority user, then at step 334, the optimal ESS is retrieved from the priority user level of the ESS tree at step 334 and sent to the user. If the user has an MFU ESS, then the optimal ESS is retrieved from the MFU level of the ESS tree at step 336 and sent to the user.

Otherwise, the Cloud Service continues down the tree as many levels as necessary at step 328 and eventually sends the user an ESS at step 330. The method then ends.

One of ordinary skill in the art with the benefit of this disclosure will understand that the preferred initialization point for the method depicted in FIGS. 3A and 3B and the order of the steps comprising the method may depend on the implementation chosen. In these and other embodiments, these method may be implemented as hardware, firmware, software, applications, functions, libraries, or other instructions. Further, although FIGS. 3A and 3B discloses a particular number of steps to be taken with respect to the disclosed method, the method may be executed with greater or fewer steps than depicted. The method may be implemented using any of the various components disclosed herein (such as the components of FIG. 1), and/or any other system operable to implement the method.

The following section describes a few examples of users and their workspaces, and the way an experience configuration snapshot is applied.

Workspace 1
    Location: Home.
    User: User A is the CEO of a company.
    Devices: Laptop, USB-C dock, two monitors, wired keyboard, wireless mouse, USB webcam.
    ESS: User A is a priority user and gets the correct ESS upon login.

Workspace 2
    Location: Office
    User: User B moves from Workspace 2 to Workspace 20 in another location for a short discussion with a coworker, briefly connecting a laptop to the dock at Workspace 20 before coming back to Workspace 2.
    Devices: Laptop, USB-C dock, conferencing monitor, wired keyboard, wired mouse, integrated webcam.
    ESS: User B does not receive a new ESS, because the TTL is very small for a short visit.

Workspace 3
    Location: Home
    User: User C always connects to Workspace 3 in the evening.
    Devices: Laptop, USB-C dock, gaming monitor, wireless keyboard, wireless mouse, integrated webcam.
    ESS: Since this user always connects to the same workspace, the correct ESS is prefetched to the laptop and applied in advance.

Workspace 4
    Location: Office
    User: User D connects to Workspace 4 and then moves to Workspace 50 for a call with a customer. After an hour, User D returns to Workspace 4. User D also frequently roams to other Workspaces to meet with team members.
    Devices: Laptop, USB-C dock, three monitors, wired keyboard, wired mouse, USB webcam.
    ESS: User B gets the ESS for Workspace 4 quickly because it is in the MFU list.

Workspace 20
    Location: Office

User: User E moves from Workspace 20 to the adjacent Workspace 21 for a discussion, connecting a laptop to the dock at Workspace 21 before coming back to Workspace 20.

Devices: Laptop, USB-C dock, conferencing monitor, wired keyboard, wired mouse, no webcam.

ESS: User E does not receive a new ESS, because the location change is small (the adjacent room).

This disclosure encompasses all changes, substitutions, variations, alterations, and modifications to the exemplary embodiments herein that a person having ordinary skill in the art would comprehend. Similarly, where appropriate, the appended claims encompass all changes, substitutions, variations, alterations, and modifications to the exemplary embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative.

Further, reciting in the appended claims that a structure is "configured to" or "operable to" perform one or more tasks is expressly intended not to invoke 35 U.S.C. § 112(f) for that claim element. Accordingly, none of the claims in this application as filed are intended to be interpreted as having means-plus-function elements. Should Applicant wish to invoke § 112(f) during prosecution, Applicant will recite claim elements using the "means for [performing a function]" construct.

All examples and conditional language recited herein are intended for pedagogical objects to aid the reader in understanding the invention and the concepts contributed by the inventor to furthering the art, and are construed as being without limitation to such specifically recited examples and conditions. Although embodiments of the present inventions have been described in detail, it should be understood that various changes, substitutions, and alterations could be made hereto without departing from the spirit and scope of the disclosure.

What is claimed is:

1. An information handling system comprising:
at least one processor; and
a memory;
wherein the information handling system is configured to:
communicatively couple to a client system, wherein the client system is associated with a current one of a plurality of potential workspaces, wherein each workspace includes a defined set of information handling resources including a plurality of physical devices communicatively coupled to the client system when the client system is in a location associated with the workspace;
receive, from the client system, a manifest indicative of the set of information handling resources associated with the current workspace;
determine an experience snapshot for the current workspace, wherein the experience snapshot includes a plurality of configuration settings for the set of information handling resources; and
transmit the experience snapshot to the client system, wherein the client system is configured to apply the experience snapshot by applying the plurality of configuration settings to the set of information handling resources.

2. The information handling system of claim 1, wherein the configuration settings include multi-monitor configuration settings and audio configuration settings.

3. The information handling system of claim 1, wherein the experience snapshot is determined based at least in part on a determination that a user of the client system is a priority user.

4. The information handling system of claim 1, wherein the experience snapshot is determined based at least in part on a determination of most frequently used workspaces for a user of the client system.

5. The information handling system of claim 1, wherein the experience snapshot is determined based at least in part on a determination that the client system has not geographically moved more than a threshold amount.

6. The information handling system of claim 1, wherein the experience snapshot is determined based at least in part on a determination of a time to live for a user of the client system, the time to live indicating a duration during which the user is in a particular workspace.

7. A method comprising:
an information handling system communicatively coupling to a client system, wherein the client system is associated with a current one of a plurality of potential workspaces, wherein each workspace includes a defined set of information handling resources including a plurality of physical devices communicatively coupled to the client system when the client system is in a location associated with the workspace;
the information handling system receiving, from the client system, a manifest indicative of the set of information handling resources associated with the current workspace;
the information handling system determining an experience snapshot for the current workspace, wherein the experience snapshot includes a plurality of configuration settings for the set of information handling resources; and
the information handling system transmitting the experience snapshot to the client system, wherein the client system is configured to apply the experience snapshot by applying the plurality of configuration settings to the set of information handling resources.

8. The method of claim 7, wherein the configuration settings include multi-monitor configuration settings and audio configuration settings.

9. The method of claim 7, wherein the experience snapshot is determined based at least in part on a determination that a user of the client system is a priority user.

10. The method of claim 7, wherein the experience snapshot is determined based at least in part on a determination of most frequently used workspaces for a user of the client system.

11. The method of claim 7, wherein the experience snapshot is determined based at least in part on a determination that the client system has not geographically moved more than a threshold amount.

12. The method of claim 7, wherein the experience snapshot is determined based at least in part on a determination of a time to live for a user of the client system, the time to live indicating a duration during which the user is in a particular workspace.

13. An article of manufacture comprising a non-transitory, computer-readable medium having computer-executable instructions thereon that are executable by a processor of an information handling system for:

communicatively coupling to a client system, wherein the client system is associated with a current one of a plurality of potential workspaces, wherein each workspace includes a defined set of information handling resources including a plurality of physical devices communicatively coupled to the client system when the client system is in a location associated with the workspace;

receiving, from the client system, a manifest indicative of the set of information handling resources associated with the current workspace;

determining an experience snapshot for the current workspace, wherein the experience snapshot includes a plurality of configuration settings for the set of information handling resources; and transmitting the experience snapshot to the client system, wherein the client system is configured to apply the experience snapshot by applying the plurality of configuration settings to the set of information handling resources.

14. The article of claim 13, wherein the configuration settings include multi-monitor configuration settings and audio configuration settings.

15. The article of claim 13, wherein the experience snapshot is determined based at least in part on a determination that a user of the client system is a priority user.

16. The article of claim 13, wherein the experience snapshot is determined based at least in part on a determination of most frequently used workspaces for a user of the client system.

17. The article of claim 13, wherein the experience snapshot is determined based at least in part on a determination that the client system has not geographically moved more than a threshold amount.

18. The article of claim 13, wherein the experience snapshot is determined based at least in part on a determination of a time to live for a user of the client system, the time to live indicating a duration during which the user is in a particular workspace.

* * * * *